United States Patent
Frigo et al.

(10) Patent No.: US 7,158,722 B1
(45) Date of Patent: Jan. 2, 2007

(54) METHOD FOR OPERATING TRANSPARENT NODE FOR WDM SHARED "VIRTUAL RING" NETWORKS

(75) Inventors: Nicholas J. Frigo, Red Bank, NJ (US); Patrick P. Iannone, Red Bank, NJ (US); Kenneth C. Reichmann, Hamilton Square, NJ (US); Aleksandra Smiljanic, Atlantic Highlands, NJ (US)

(73) Assignee: AT&T Corp., New York, NY (US)

( * ) Notice: Subject to any disclaimer, the term of this patent is extended or adjusted under 35 U.S.C. 154(b) by 777 days.

(21) Appl. No.: 09/902,944

(22) Filed: Jul. 12, 2001

Related U.S. Application Data

(60) Provisional application No. 60/217,910, filed on Jul. 13, 2000.

(51) Int. Cl.
H04B 10/08 (2006.01)
H04B 10/20 (2006.01)

(52) U.S. Cl. ............................. 398/30; 398/31; 398/58; 398/59

(58) Field of Classification Search .................... 398/3, 398/4, 30, 31, 32, 58, 59
See application file for complete search history.

(56) References Cited

U.S. PATENT DOCUMENTS

| | | | |
|---|---|---|---|
| 5,572,612 A | 11/1996 | Delavaux et al. | |
| 5,801,861 A * | 9/1998 | Majima | 398/95 |
| 5,854,698 A | 12/1998 | Eskildsen et al. | |
| 5,886,801 A * | 3/1999 | Van Deventer | 398/59 |
| 6,222,654 B1 | 4/2001 | Frigo | |
| 6,252,881 B1 * | 6/2001 | Samoylenko | 370/433 |
| 6,256,431 B1 | 7/2001 | Mesh | |
| 6,278,818 B1 | 8/2001 | Laming et al. | |
| 6,366,373 B1 * | 4/2002 | MacKinnon et al. | 398/31 |
| 6,426,815 B1 * | 7/2002 | Koehler | 398/59 |
| 6,509,986 B1 | 1/2003 | Mizrahi | |

(Continued)

OTHER PUBLICATIONS

L. H. Spiekman et al., "A Flexible Metro WDM ring using wavelength-independent subscriber equipment to share bandwidth", Optical Fiber Communication Conference, Mar. 2000, pp. PD 38-1/281-283.*

(Continued)

*Primary Examiner*—M. R. Sedighian

(57) ABSTRACT

A system and method for a transparent WDM metro ring architecture in which optics enables simultaneous provisioning of dedicated wavelengths for high-end user terminals, while low-end user terminals share wavelengths on "virtual rings". All wavelengths are sourced by the network and remotely modulated at customer "End Stations" by low cost semiconductor optical amplifiers, which also serve as transmission amplifiers. The transparent WDM metro ring architecture permits the communication of information and comprises a fiber optical feeder ring, at least one fiber optical distribution ring, a network node (NN), at least one access node (AN) said network node and said at least one access node connected via said fiber optical feeder ring and at least one end station (ES) connected via said fiber optical distribution ring to said at least one access node, wherein said user is attached to said at least one end station. A simple node that supports bi-directional propagation in transparent WDM metro architectures using "virtual rings" is also described. A method for communicating information over a WDM fiber optical ring network architecture in a metro access arena using one or more wavelengths, which can be shared by a plurality of user terminals, each user terminal coupled to an end station comprises the steps of sending downstream data packets, sending optical chalkboard packets consisting of ones and sending control signals.

16 Claims, 12 Drawing Sheets

U.S. PATENT DOCUMENTS

| | | |
|---|---|---|
| 6,616,348 B1 | 9/2003 | Barnard |
| 6,616,349 B1* | 9/2003 | Li et al. .................... 398/4 |
| 6,766,113 B1* | 7/2004 | Al-Salameh et al. .......... 398/30 |
| 6,785,473 B1* | 8/2004 | Sasaki et al. ................ 398/79 |
| 7,006,767 B1* | 2/2006 | Frigo et al. .................. 398/59 |
| 2002/0033416 A1* | 3/2002 | Gerszberg et al. .......... 235/380 |

OTHER PUBLICATIONS

K.C. Reichmann, P.P. Iannone, M. Birk, N.J. Frigo, and C.F. Lam, "Simultaneous Delivery of 1280 Video Channels over a WDM Passive Optical Network," ECOC Sep. 2000: 26th Annual Conference on Optical Communication, Munich, Germany, pp. 79-80.

K.C. Reichmann, N.J. Frigo, P.P. Iannone and L. H. Spiekman, "A Simple Bi-directional Node for WDM Virtual Ring Networks", LEOS 2000 Annual Meeting Conference, Nov. 2000, pp. 690-691.

P.P. Iannone, K.C. Reichmann, A. Smiljanic, N.J. Frigo, A. H. Gnauck, L.H. Spiekman, and R. M. Derosier, "A Transparent WDM Network Featuring Shared Virutal Rings", Journal of Lightware Tech., vol. 18, No. 12, Dec. 2000, pp. 1955-1963.

P.P. Iannone, K.C. Reichmann, N.J. Frigo, A.H. Gnauck, and L.H. Spiekman; "A Flexible Metro WDM ring using wavelength-independent subscriber equipment to share bandwidth", Optical Fiber Communication Conference, Mar. 2000, pp. PD38-1/281-28.3.

P.P. Iannone, K.C. Reichmann, M. Birk, N.J. Frigo, R.M. Derosier, D. Barbier, C. Cassagnettes, T. Garret, A. Veriucco, S. Perrier, and J. Phillipsen, "A 160-km Transparent Metro WDM ring network featuring cascaded erbium-doped waveguide amplifiers", OFC 2001: Optical Fiber Communications Conference, Mar. 2001, vol. 3, pp. WBB3-1-WBB3-3.

Y. Chen, M. T. Fatehi, H. J. LaRoche, J. Z. Larsen and B. L. Nelson, "Metro Optical Networking", Bell Labs Tech. Journal, vol. 4, N.1, Jan.-Mar. 1999, pp. 163-186.

R.C. Alferness, P. A. Bonenfant, C.J. Newton, K.A. Sparks E. L. Varma, "A Practical Vision for Optical Transport Networking", Bell Labs Tech. Journal, vol. 4, N.1, Jan.-Mar. 1999, pp. 3-18.

J. M. Simmons & A.A. M. Saleh, "Optical Region Access Network (ORAN) Project", OFC 1999: Optical Fiber Communications Conference, Feb. 1999. pp. WK1-1/178-180.

* cited by examiner

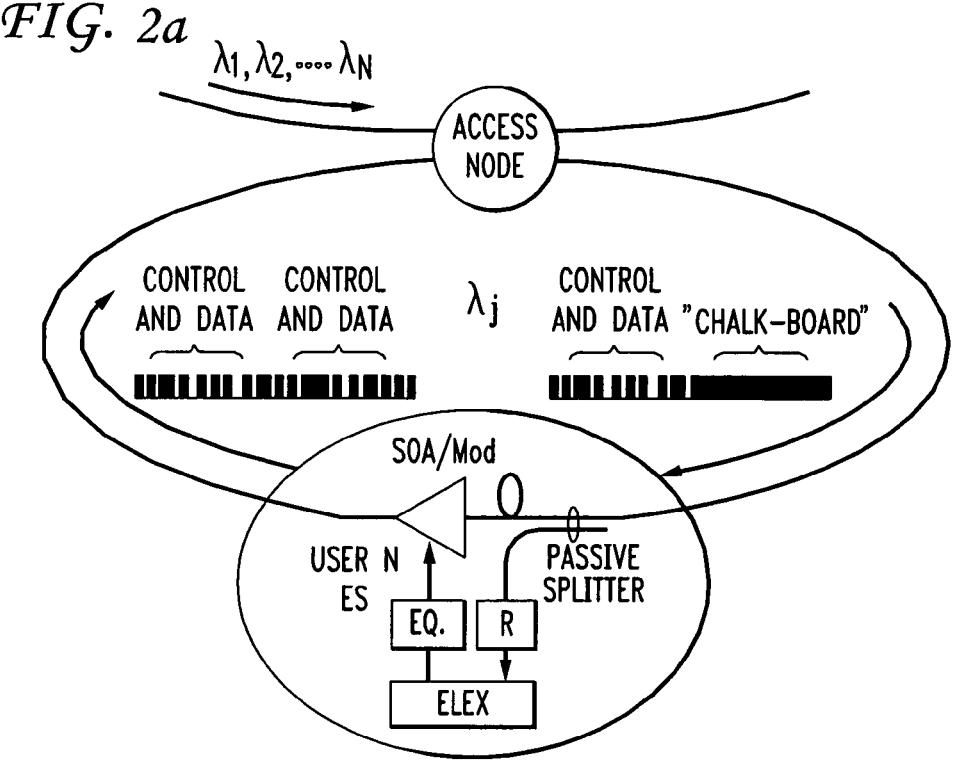
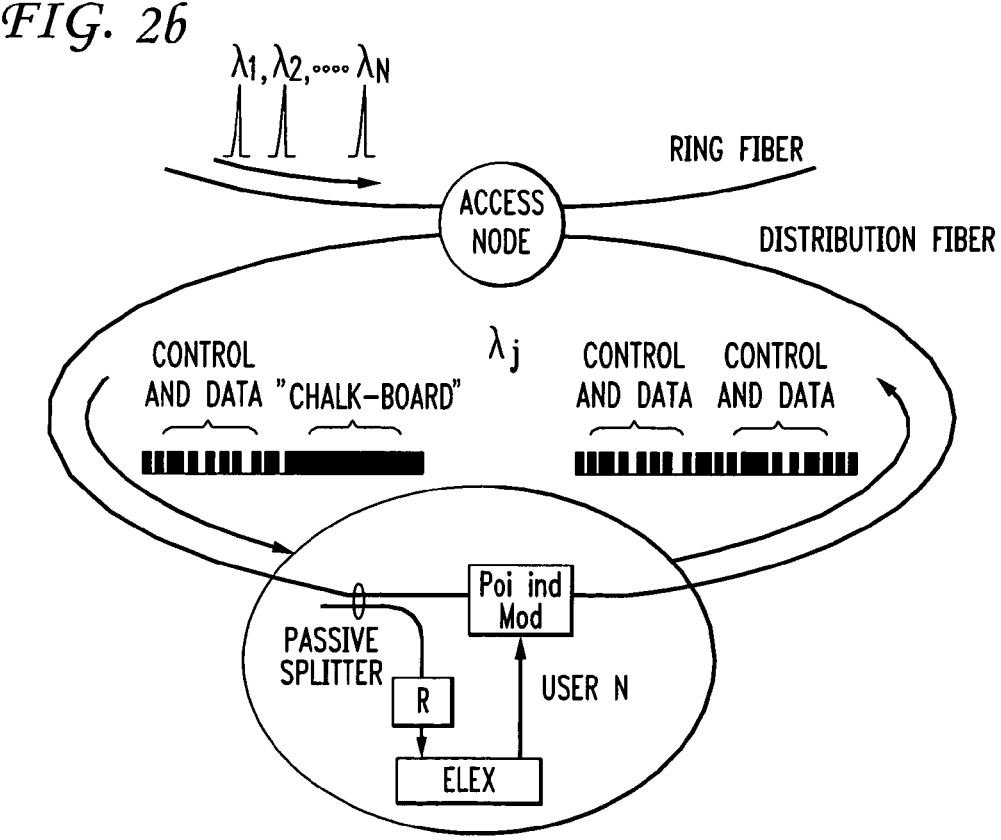

METHOD FOR OPERATING TRANSPARENT NODE FOR WDM SHARED "VIRTUAL RING" NETWORKS

This application claims the benefit of priority of Provisional Application No. 60/217,910, filed on Jul. 13, 2000, and is related by subject matter to U.S. patent application Ser. No. 09/902,806 filed Jul. 12, 2001, entitled "System For Transparent Node For WDM Shared "Virtual Ring" Networks", by the inventors of the present application filed concurrently herewith.

FIELD OF THE INVENTION

The invention relates to Wavelength Division Multiplexed (WDM) networks in general. More specifically, the invention relates to the use of WDM virtual ring networks in and as metropolitan access rings where the access rings become transparent, may be unidirectional or bi-directional and may also be fault tolerant.

BACKGROUND OF THE INVENTION

Optical networking has shown itself to be valuable in core transport networks, in large part due to the use of wavelength division multiplexing (WDM). More recently, WDM optical networking has also become important in the metro access arena. The D.A.R.P.A. Next Generation Internet (NGI) initiative, for example, is especially interested in investigating the issues surrounding transport of Internet Protocol (IP) traffic over such networks, and recent commercial vendor activity in this space is also evidence of a growing awareness of the need for flexible and high-capacity solutions.

The demands on metro networks are stringent, since the traffic is more diverse than traffic in the core, yet the system costs must be smaller. Ring architectures are generally preferred since they offer more cost-effective management and protection options, as evidenced by the performance and acceptance of SONET systems that have been used in metropolitan (metro) office rings. As in the core networks, WDM is expected to play an important part for several reasons. First, it allows existing fiber to be "mined" for more bandwidth capacity by using additional wavelengths of light. This prevents "fiber exhaust" on existing routes, defers the need to deploy more fibers, and permits more flexible transport solutions. Traditional SONET equipment, for example, could be used on each wavelength, forestalling the need to go to higher data rates in the hierarchy. Second, more sophisticated optical networking (i.e. more sophisticated than simply increased transport capacity) can be performed by utilizing the wavelengths as optical channels, which can be provisioned, added, dropped, routed, and managed as individual entities, independent of the data format they carry. A third, and corollary reason is that WDM allows service transparency, permitting new services with independent formats to be developed and distributed without hardware or facility changes. The extra dimension in wavelength also permits efficient and cost effective terminal solutions through using transparency to transport data in native format, rather than requiring conversions and multiplexing. Transparency (with regard to optical networking) signifies that the optical signals do not undergo optical-to-electrical-to-optical conversions as they traverse the network. Additional cost-effective properties include stability and passivity.

SUMMARY OF THE INVENTION

An architecture suitable for metro access networks, which exploits the above features, is described herein. Specifically, the architecture is a WDM ring, using individual wavelengths to provision services to a geographically diverse set of user terminals. Each wavelength forms a virtual ring and operates independently of the other rings. The architecture further uses optical networking to allow user terminals to participate on different virtual rings. That is, neighboring user terminals could be on the same or different virtual rings, by virtue of the fiber optic connections to the ring nodes. User terminals can be provisioned to share a wavelength with other user terminals, if costs or common channels dictate it, or could have dedicated wavelengths if demanded. Over time, the connections can change or new wavelengths can be added. Each virtual ring forms a network of user terminals connected to a common central hub. The virtual rings are independent, and can support packet-based traffic. Each is amenable to a variety of known or new protocols. As illustrative examples, the use of two known Media Access Control (MAC) protocols is described. Optical technology permits the use of a standard optical unit that is not necessarily registered to the wavelength of the user's virtual ring, and could be used to access any fraction of a wavelength's bandwidth, up to the entire channel capacity. A variety of ways of partitioning bandwidth is also described. While a single architecture is presented, it is possible to consider this as an overlay. That is, all the wavelengths described herein can be considered to be some subset of the wavelengths carried on the ring: the other wavelengths might be bearing more conventional circuit-switched traffic, for example.

Since all of the wavelengths are centrally sourced at a common network node, user terminals employ modular wavelength- and polarization-independent modulators to encode upstream data on network-provided optical carriers, thus alleviating much of the complexity related to monitoring and controlling wavelengths injected onto the ring by user terminals. A transparent bi-directional access node using existing (and potential future) MAC protocols further improves network efficiency. Further novel features relating to protection against fiber and node failures, access node and end station design, and improvements to the MAC protocol are also possible.

It is, therefore, an object of the present invention to allow a plurality of user terminals (each user attached to an end station) to share one or more wavelengths with other user terminals on the virtual rings.

It is a further object of the present invention to allow multiple user terminals with arbitrary geographical distribution to share a metro ring architecture capable of supporting multiple virtual transparent rings.

It is yet another object of the present invention to include a bi-directional node for the WDM shared virtual ring networks.

BRIEF DESCRIPTION OF THE DRAWINGS

The invention is best described with reference to the detailed description and the following figures, where:

FIG. 2a depicts the details of an exemplary embodiment of an End Station (ES).

FIG. 2b depicts an alternative exemplary embodiment of an ES.

FIG. 12b depicts an alternative exemplary embodiment of a bi-directional node of a shared transparent WDM "virtual ring" network.

FIG. 12c shows the BER results for the bi-directional node of the shared "virtual ring" network depicted in FIG. 12a.

DETAILED DESCRIPTION OF THE PREFERRED EMBODIMENTS

Figure 1:
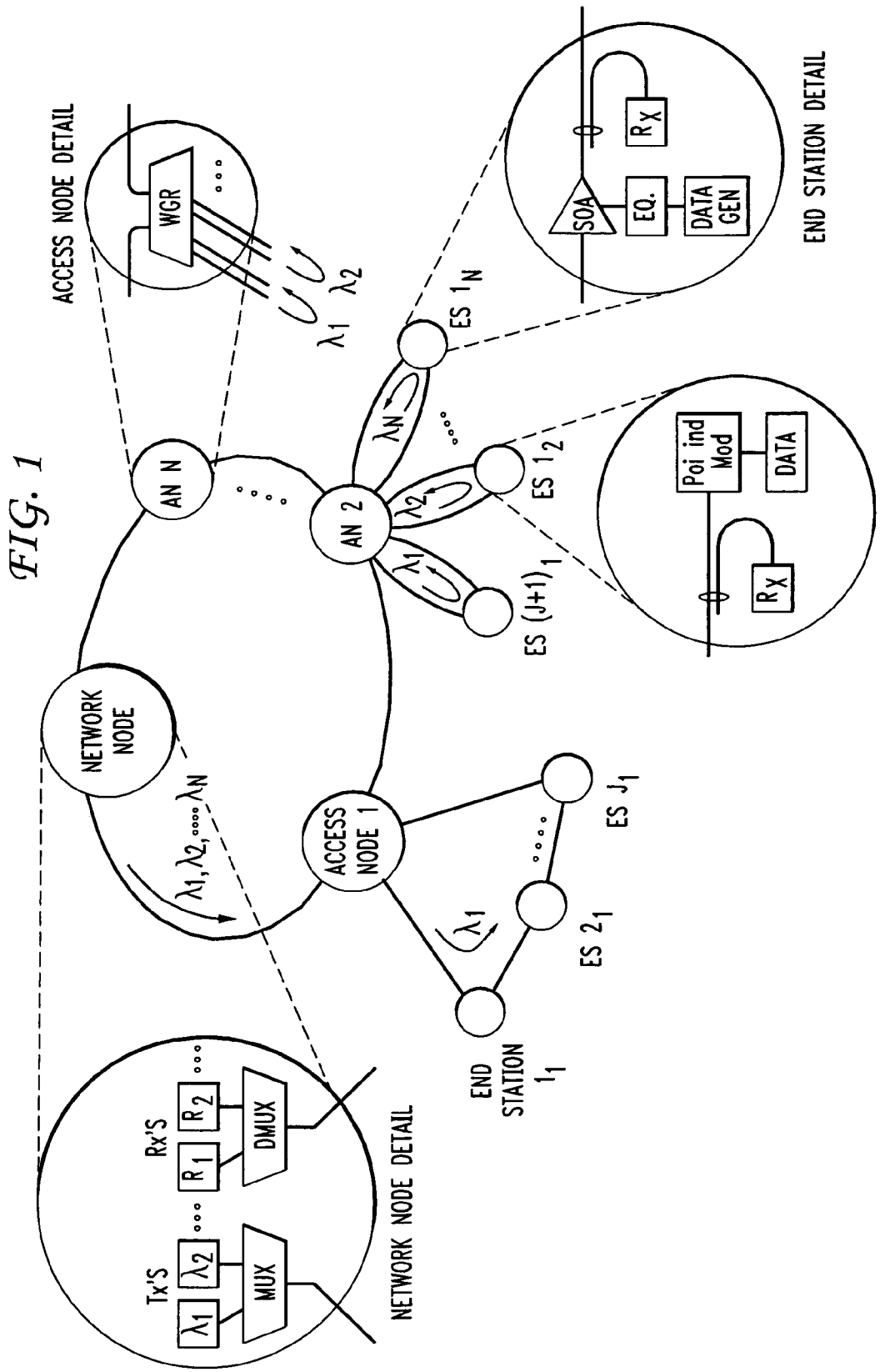
FIG. 1 is a layout of the architecture.

FIG. 1 shows a schematic of the basic layout. In such a unidirectional architecture a hub "Network Node" (NN) provides the ring's optical carriers, sending (1) downstream data packets, (2) "optical chalkboard" packets consisting of, for example, all "1's," and (3) control bits or signals. A "optical chalkboard" may also consist of alternating "1's" and "0's" or any other pattern that is recognizable for the purposes of control signals, maintaining or establishing timing or relaxing the low-frequency performance requirements of the lasers, detectors and associated electronic circuitry. In the case of on-off keyed modulation it is desirable to have those bits that are available to have the level of a digital one. In this way, a digital one can be created by passing and amplifying the light for one bit period. Similarly, a digital zero can be created by blocking light with the modulator for one bit period. If the optical chalkboard consists of all "0's" then there is no optical carrier to be modulated or amplified. User terminals read data packets addressed to them, pass (through, for example, SOAs or amplifiers exhibiting substantially equivalent performance) packets not addressed to them, and write data (by gating an SOA or other type of optical modulator) onto optical chalkboards when permitted to do so by the control bits. SOAs provide a modular, cost-effective replacement for wavelength-specific lasers by virtue of their insensitivity to wavelength (over the usable optical bandwidth of the device) and polarization variations.

The Network Node (NN), comprising WDM sources and receivers, sends WDM signals ($\lambda_1$–$\lambda_N$) along the feeder fiber to Access Nodes (ANs), implemented in this embodiment with Waveguide Grating Routers (WGR). Pairs of WGR output ports define distribution loops in which a single wavelength, forming a virtual ring, can be accessed by one or more End Stations (ES). The WGRs (also known as Arrayed Waveguide Gratings (AWGs) in the above embodiment act as static Optical Add-Drop Multiplexers (OADMs) That is the WGRs demultiplex the ring wavelengths that are directed to users (or expressed for an AN) and then multiplex the wavelengths back onto the ring fiber. This functionality could also be performed by other types of static or dynamic OADMs. In one embodiment, End Stations consist of receivers (Rx) for downstream information and in a preferred embodiment semiconductor optical amplifiers (SOA), which amplify and modulate light to create upstream signals. That is, the architecture is a hubbed ring with a Network Node (NN) connected via "feeder" fiber to several Access Nodes (AN), which in turn serve subscribers at End Stations (ES) over "distribution" fibers. Further, as shown in FIG. 1 in an alternative ES embodiment, an ES consists of receivers (Rx) for downstream information and polarization independent modulators. In the present invention, the optical signals emanate from the NN, are dropped optically at each AN, traverse each user ES (still in optical form), are added onto the ring fiber optically and finally terminate at the NN. More conventional optical networks, such as SONET ring optical networks, terminate wavelengths at NNs, add and drop data in electrical form and then source new wavelengths destined for the next node.

The distribution scheme is based on an earlier "RITE-Net" WDM star architecture for passive optical networks (PONs). In that PON, individual user terminals communicate to the hub by using wavelength-independent modulators to impress data on the optical carriers provided to them by the network node. The present invention extends that architecture in several dimensions, as described below.

First, the present invention applies the distribution scheme to a ring, rather than a PON star. This is important because rings are inherently different than star configurations. This maps the PON's hub or central office to the ring's Network Node and maps the PON's remote node to the ring's Access Node. The NN contains (see inset, FIG. 1) a WDM transmitter (represented as multiple sources and a multiplexer) to create data packets at the $\lambda_i$ to be sent downstream for each virtual ring, and a corresponding WDM receiver to detect each of the upstream signals. The Access Node is implemented by using a waveguide grating router. Light from the feeder ring (left top fiber in AN inset) enters a waveguide grating router (WGR) input port and is demultiplexed according to its wavelength. According to the "routing property or scheme" of the WGR, if light of a given wavelength, after exiting a WGR port on the distribution side, re-enters an adjacent distribution side port ($\lambda_1$ and $\lambda_2$ loopbacks in AN inset), it will emerge on a port adjacent to the feeder ring input (right top fiber in AN inset). In this way, the AN provides (to the distribution loops) access to the virtual rings in the feeder fiber.

The light on the distribution loops provides both downstream information and the ability to send upstream information, as shown in FIG. 2a. Incoming light consists of data packets and unmodulated "optical chalkboards" upon which upstream data signals can be impressed for transmission. The passive splitter taps a portion of the light for the receiver to decode downstream information (packets), and passes the remainder to the SOA. If correct permission is granted in the control bits preceding a chalkboard (by use of for example, a protocol), the ES may write data (an upstream message) by modulating the chalkboard. That is, modulated light enters the End Station for user N, where a portion is split off to a receiver, which recovers the downstream information, and the remainder is passed to a semiconductor amplifier (SOA)/modulator. The light contains both downstream data and long unmodulated portions (this is the optical chalkboard) upon, which upstream data can be impressed by modulation. A protocol establishes, through control bits, whether or not user N can seize this "chalkboard" for modulating upstream data. The light, modulated or not, re-enters the access node and continues onto the feeder ring towards the next access node or the hub. This technique is a generalization of the PON architectures and, unlike an earlier approach does not require two separate wavelengths per user for reading and for writing data, thereby simplifying the optical infrastructure. In an alternative embodiment, the passive splitter taps a portion of the light for the receivers to decode downstream information and passes the remainder to a polarization independent modulator.

Second, instead of having each user, by virtue of the star topology, consume a unique wavelength, the wavelengths can be shared among either several end stations at an Access Node or among end stations at different Access Nodes, or both. This permits a group of user terminals to share bandwidth by using packets, and requires a MAC protocol to determine which user terminals are permitted to overwrite the chalkboard in which time slots. In FIG. 1, "ES $K_i$," is meant to denote that the end station is the $K^{th}$ end station on the virtual ring served by wavelength $\lambda_1$. Note that in the Figure, $\lambda_1$ serves J end stations associated with Access Node 1 and one end station associated with Access Node 2, so these J+1 end stations are all on the same virtual ring. Some high-end user terminals may consume an entire wavelength themselves. Even in this dedicated wavelength situation, there are advantages to the approach of the present invention, since, for example, the wavelength control problem does not need to be solved by the End Station.

Third, instead of a simple modulator as in the PON, a semiconductor optical amplifier (SOA) to both optically amplify the signals and to modulate optical chalkboards with upstream data as shown in the End Station inset is used. Optical amplification is necessary to support the ring lengths (on the order, for example, of 200 km) expected in some metro applications and to overcome excess losses incurred by traversing successive WGRs in the Access Nodes. When the light entering the SOA is bearing data for this or another end station, the SOA acts simply as a single channel optical amplifier. However, when data is to be transmitted upstream from the ES, the upstream electrical signal is applied to the SOA, thereby modulating the optical chalkboard. Like a broadband optical modulator, the SOA is essentially indifferent to the wavelength (wavelength independent) of the light used: the stimulated emission will be at the same wavelength as the input light. This feature makes it possible to have a universal design so that each ES would be identical, regardless of which virtual ring it occupied. Amplification at the end stations used only as channel equalizers are used to compensate for the loss in the fiber optical distribution loop and the associated optical components. This avoids the need for individual amplifiers for each wavelength at each AN. In this way, the line amplifiers can be shared over all wavelengths. As in all cascaded systems, the buildup of noise must be considered. While the limitation imposed by amplified spontaneous emission is dependent on the loss between amplifiers and the amplifier noise figure, it is reasonable to expect that a properly engineered system could support at least eight cascaded ESs on each virtual ring.

Figure 3:
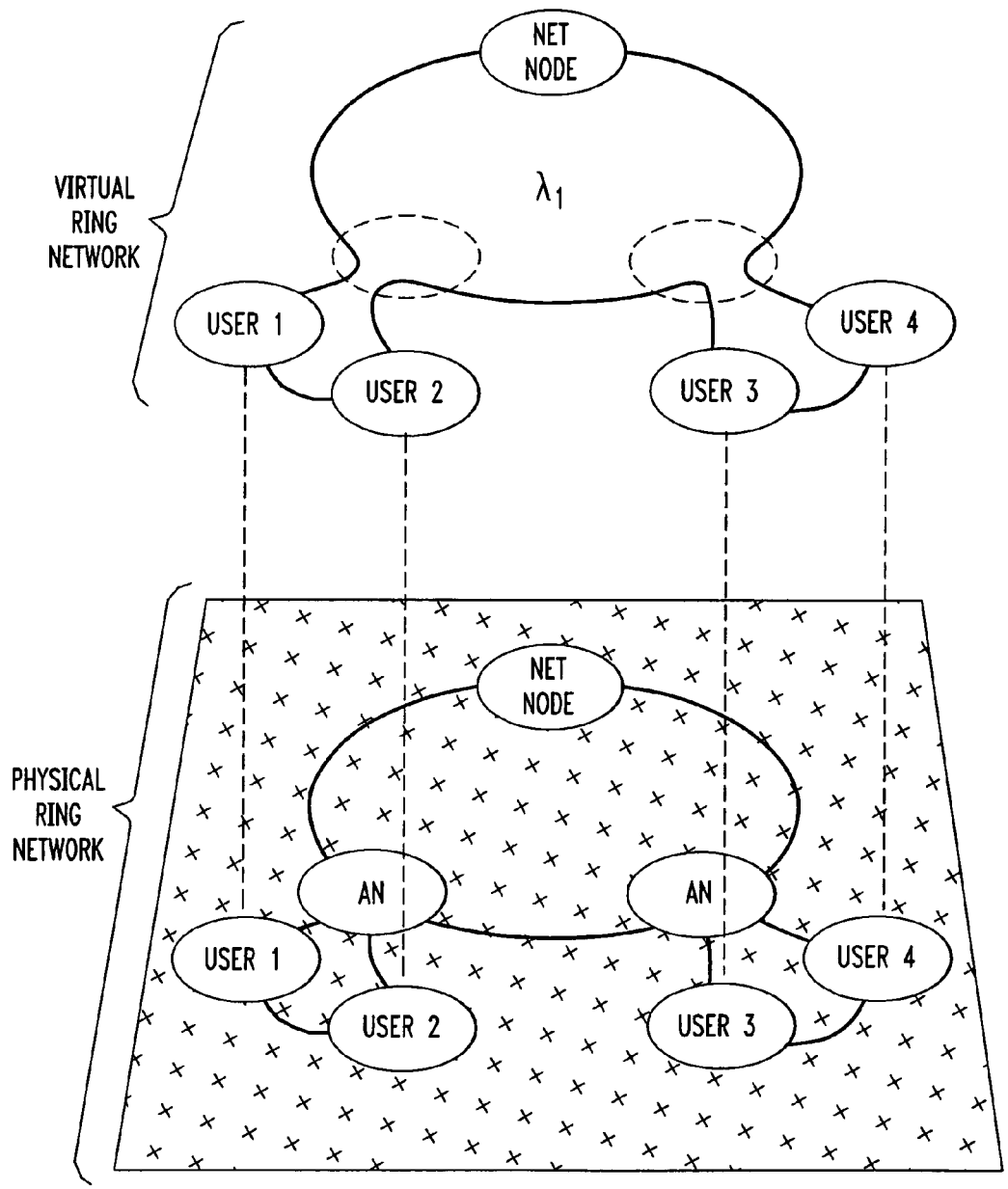
FIG. 3 depicts a Shared Virtual Ring.
Figure 4:
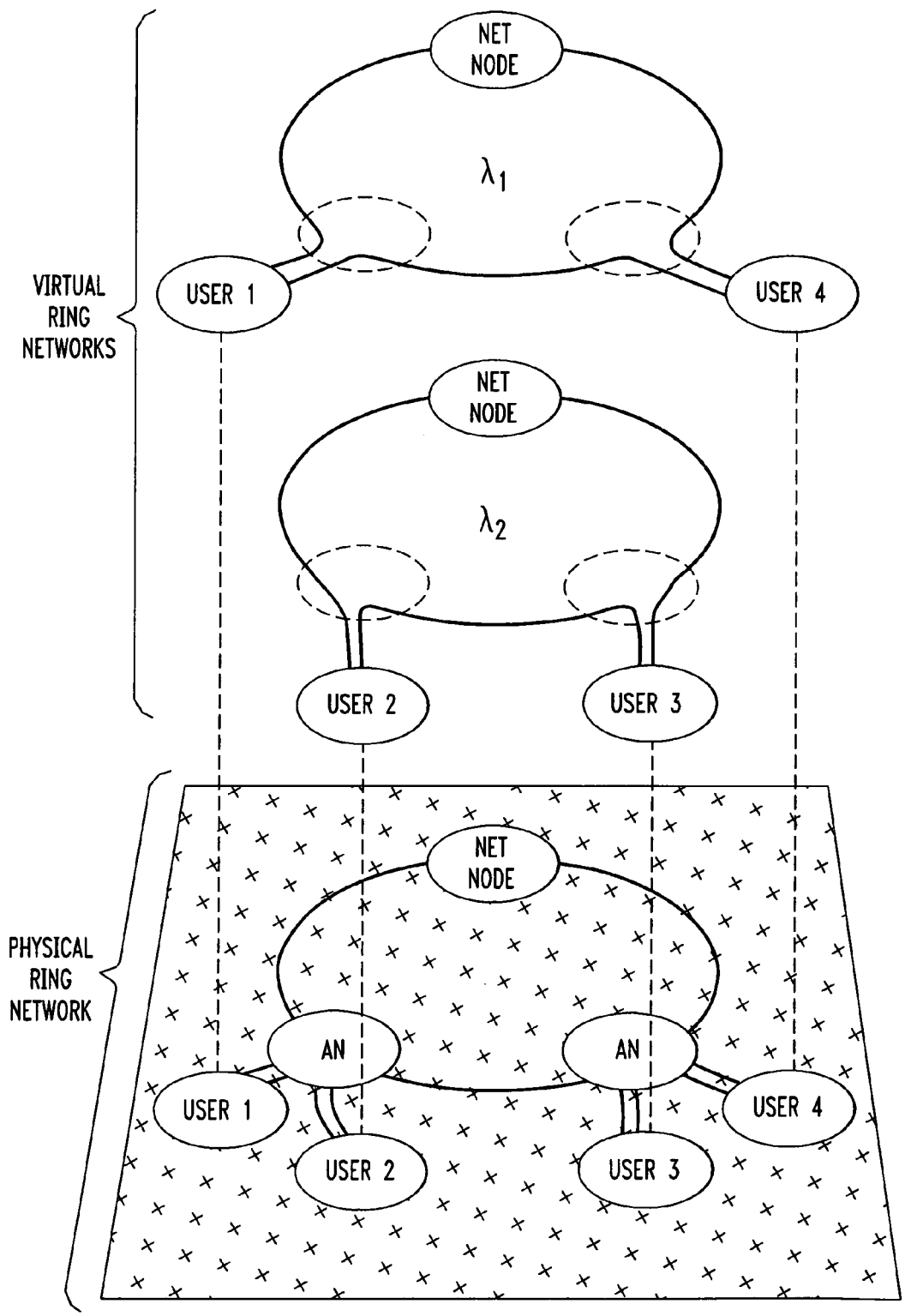
FIG. 4, like FIG. 3, depicts a Shared Virtual Ring but in FIG. 4 only two ESs share the bandwidth of each of two virtual rings.
Figure 5:
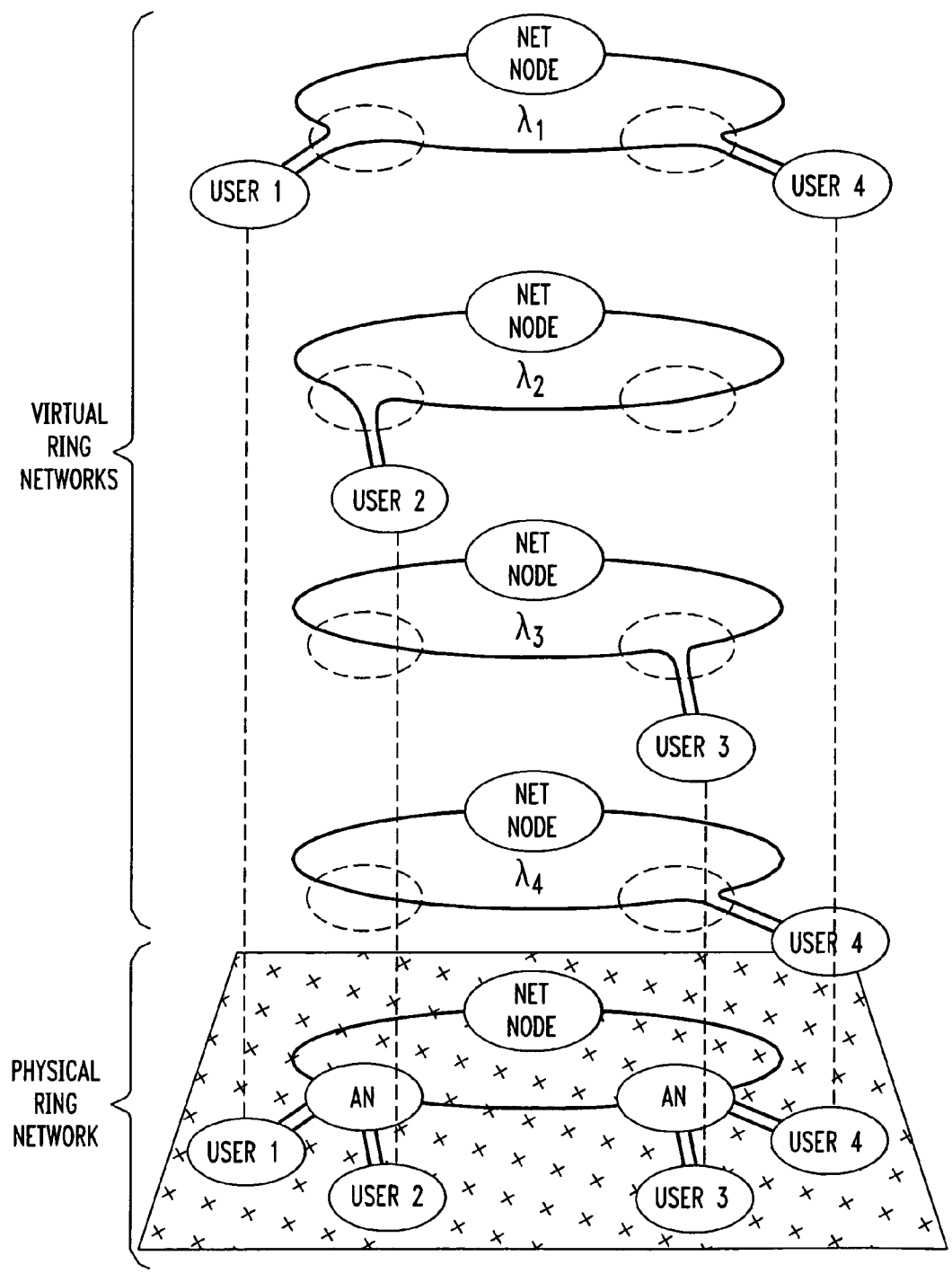
FIG. 5 shows a high capacity network.

The examples in FIGS. 3–5 show the flexibility in provisioning that the architecture enables due to the devices. In all cases, the shaded plane represents the physical layout of a simple network: two ANs, each with two user terminals nearby. In the vertical direction, different virtual rings for several wavelengths are plotted.

Thus, in FIG. 3, all four user terminals are on the same shared virtual ring. The shaded plane represents the physical layout, in which two ANs, each with two ESs, share a single virtual ring. The equivalent optical connections are shown in the virtual ring above the plane. That is, the user terminals served by each AN are connected on a single loop. By virtue of the operation of the ANs, this makes all four user terminals connected on the same virtual ring. The upper plane shows the connection at $\lambda_1$, demonstrating the virtual ring directly. This is a low performance case in which multiple user terminals will all share their single wavelength's bandwidth, according to their protocol. An example would be a network of remote campus locations. This is clearly a case, which exploits the fact that fiber can support multiple wavelengths simultaneously, and permits a service, which might be difficult to justify economically if conventional transport solutions were required, but would be an additional service opportunity as an overlay.

FIG. 4 shows a slightly more aggressive implementation. Now, two networks are formed, one for user terminals 1 and 4 and the other for user terminals 2 and 3. The optical hardware is essentially the same in this case, but now the architecture at the ANs looks as if it is in a star configuration locally, while it is still in a virtual ring configuration globally. Since each user on each AN is unique, the physical layout at each AN looks more like a tree. The reduced sharing indicates that the traffic loads are higher in this case.

An even more aggressive situation is shown in FIG. 5. Applications require almost all of the line rate, so user terminals generally do not share bandwidth with other user terminals. Note that it is possible that a single user can use more than one wavelength, and thus be on more than one virtual ring. For example, user terminals 2 and 3 consume so much bandwidth that they are unable to share it with other user terminals. At the same time, user 4, perhaps a computer facility, is both a solitary user on $\lambda_4$, communicating to remote sites, and also shares a ring with user 1, perhaps an administration center, on $\lambda_1$.

This approach has some potential pitfalls, following from the fact that the virtual rings are unbroken light paths, which can be shared over a wide area with terminal equipment that is not wavelength-specific. First, re-provisioning is more complicated than if user terminals were connected to a physical star architecture. Second, because the virtual ring is continuous, it must be linked through ANs regardless of the number of End Stations served by that AN. All virtual rings not serving End Stations on a given AN must be completed by looping the demultiplexed wavelengths back into the WGR, as shown in the AN detail in FIG. 1. These looped-back wavelengths must be individually amplified, adding additional cost per subscriber in a sparsely populated scenario. This problem could be solved by moving the transmission amplifiers to the ring fiber and trimming the ES gain so that the ES and distribution fiber have zero net loss (in this way, a simple fiber jumper could be used to loop-back wavelengths that are not serving an ES on a given AN). Additionally, a wavelength assignment algorithm, a common bypass scheme, or amplifiers at output nodes of the WGRs could be used to help correct the problem. Third, because of the terminal's simplicity, there is no wavelength reuse. Thus, if ES 2 sends a packet to ES 3, that time slot is unusable for user terminals 4 through N. This entails a tradeoff between system simplicity and throughput. Finally, the failure of a single ES could disrupt service for all user terminals on that virtual ring, thus potentially increasing the complexity and cost of the network protection scheme. In summary, the disadvantages of the network are directly related to the fact that a single wavelength can be shared over a wide area with terminal equipment that is not wavelength-specific.

The architecture of the present invention, however, has several expected operational advantages. First, the wavelength independence of the end station optical unit should reduce the installed first cost (installation or initial costs) as well as the operational burden. Wavelength control only needs to be performed at the NN, instead of at each of the end stations. Since many multi-wavelength WDM transmitters have the feature that they tune as a comb, it is likely that wavelength can be controlled at the hub with a single degree of freedom. Second, since all wavelengths are sourced and terminated at a common location, management functions, which normally require telemetry, such as performance monitoring and fault detection, should be simplified. Third, the nature of the AN makes provisioning this network extremely flexible. Fourth, the ring nature of the connection makes it possible to use protocols that have been optimized for ring performance, as discussed hereinafter. Newer protocols, based on others that were not specifically designed for rings, are also possible, utilizing the ring, modulation, and packet nature of the network.

Although many previously reported medium access control (MAC) protocols can be modified to serve as the MAC for ring network of the present invention, two particularly suitable candidates are Fiber Distributed Data Interface (FDDI), which includes a standardized medium access control (MAC) protocol for optical ring networks, and ADAPT, a MAC proposed for networks with tree topologies. The ADAPT protocol is described in "A Braodband Multiple Access Protocol for STM, ATM, and Variable Length Data Services on Hybrid Fiber-Coax Networks" by B. Doshi, S. Dravida, P. Magill, C. Siller, and K. Sriram published in Bell Labs Technical Journal, Vol. 1, Number 1, 1996 and incorporated herein by reference.

In a typical FDDI implementation, the optical signal is regenerated at each end station, requiring a separate laser diode per site. This is especially onerous in a WDM ring, in which each transmitter must have the correct wavelength. However, the basic concept of FDDI can be readily applied to our network in which the Network Node (NN) provides End Stations (ES) with an optical chalkboard. One token is passed from station to station, and the station that possesses the token at a given time transmits data as long as allowed by its counters. It will hold the token at most for the negotiated time duration, unless the token has arrived earlier than scheduled (evidence that the previous stations have not used their negotiated bandwidths) in which case a station can transmit for a longer time. The NN also may transmit data when it holds the token. If it is not transmitting data, it transmits an optical chalkboard (during which time it does not pass any incoming packets). But while it is transmitting an optical chalkboard, some incoming packets may arrive at the NN on their way from source to destination (for instance, when ES $(J+1)_1$ sends a packet to ES $1_1$ or ES $J_1$). For this reason, FDDI should be modified somewhat in the architecture of the present invention. For example, packets from ES $(J+1)_1$ to ES $1_1$ are sent to the NN first, are stored, and then retransmitted later when the token arrives at the NN. This preserves the unidirectional FDDI character. Another possibility is to allow transmissions in both directions using either two different fibers or two different wavelengths on the same fiber. The Network Node feeds counter-propagating rings with two optical chalkboards in this case. Then, for instance, station ES $(J+1)_1$ transmits packets to station ES $1_1$ in the clockwise direction, while station ES $1_1$ transmits packets to station ES $(J+1)_1$ in the counter-clockwise direction.

It should be noted that the network efficiency in FDDI on a unidirectional ring is lower than that of FDDI on a bi-directional ring. In FDDI on a bi-directional ring, packets traverse the ring only once. In FDDI on a unidirectional ring, however, those upstream packets that must pass through the hub station (Network Node) will traverse the ring twice, otherwise the packets will traverse the ring only once. Assuming that r/2 of the packets pass through the Network Node, where r is the fraction of traffic remaining in the ring, then packets (on average) pass (1+r/2) rings. If $v_b$ denotes the efficiency of the bi-directional FDDI, and $v_u$ denotes the efficiency of the unidirectional FDDI, then it holds that $$v_u = v_b/(1+r/2) = 2v_b/(2+r)$$

so that the unidirectional case is as much as 33% less efficient than the bi-directional case. Also, for unidirectional FDDI, packets that traverse the NN may experience an additional delay waiting to be retransmitted. On the other hand, a unidirectional FDDI might have a favorable optical implementation. In both proposed FDDIs the NN continually negotiates the bandwidth that will be used for packets entering and leaving the metro-ring, and therefore it flexibly follows the change in the local-to-backbone traffic ratio.

Control in ADAPT is centralized, and in the architecture of the present invention control would be performed by the Network Node. End Stations use upstream bandwidth (e.g. parts of time slots in a slotted ring) to send requests to the NN. The NN schedules transmissions and sends acknowledgements to End Stations by using downstream bandwidth. ADAPT can also be implemented on unidirectional and bi-directional rings. If applied on a unidirectional ring, the efficiency in ADAPT degrades similarly to the FDDI case above.

In comparing the FDDI and ADAPT protocols, there are some trade-offs. The benefits of FDDI are twofold. Because of its simplicity FDDI can be implemented at high bit-rates supported by developing optical technology. At the same time, FDDI guarantees end stations negotiated bandwidth and access delays satisfying the requirements of most multimedia applications. FDDI-II has been developed to support isochronous circuit-switched traffic as well. An advantage of ADAPT is that the Network Node might meet more sophisticated service requirements since ADAPT has complete information about the traffic in the network. On the other hand, more complex processing might be a burden at very high bit-rates. The optical architecture of the present invention allows the MAC decision to be made based on the application.

Figure 6A:
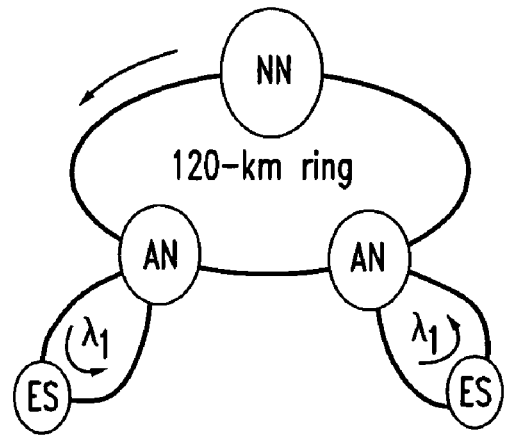
FIG. 6a depicts two Access Nodes (ANs), each with a single ES using a single wavelength virtual ring.

Three experimental configurations of a 120-km three-node ring were implemented and used to demonstrate the flexibility of the architecture and the feasibility of using SOAs as remote modulator/amplifiers. The first configuration, shown schematically in FIG. 6a, is a single-wavelength virtual ring shared by two user terminals, with one user per AN serving area. The second configuration, shown in FIG.

7a, depicts an increase in the number of user terminals per virtual ring from two to four. The third configuration (FIG. 8) shows the same four user terminals sharing two virtual rings (two user terminals per virtual ring), thus permitting higher per-user data rates than in the previous single virtual ring configuration. The relationships between the physical network layouts for the last two configurations, shown in FIG. 7a and FIG. 8, and their corresponding virtual ring networks are shown in FIGS. 3 and 4, respectively.

The 120-km ring employs two ANs and a NN, each separated by 40 km of conventional single-mode optical fiber. The average loss per 40-km span in the tested system is 8.3 dB. In the NN, multiple single-wavelength sources (here two sources are demonstrated) are multiplexed onto the ring. The launched optical power is 6 dBm per wavelength. At each AN, the light enters a (2×16)-port WGR, with 50-GHz channel spacing, is demultiplexed, and distributed to the user End Station(s). Each ES includes a 3-dB splitter, which directs half the light to a polarization-insensitive (<1 dB) 1.5-μm semiconductor optical amplifier (SOA) and half to a PIN-FET receiver. The SOAs are pre-biased and directly modulated to 100% modulation depth with a 622 Mb/s pseudo-random pattern of length $2^{23}-1$. The typical fiber-to-fiber gain is 14 dB. After traversing the ES(s), light reenters the AN, and is multiplexed back onto the fiber ring, via the "routing property" of the WGR as described above. At the receiver in the NN, the demultiplexer is simulated by a tunable optical bandpass filter with a 3-dB bandwidth of 1.3 nm. A variable optical attenuator and in-line power meter are inserted before the PIN-FET receiver to measure sensitivities.

Figure 6B:
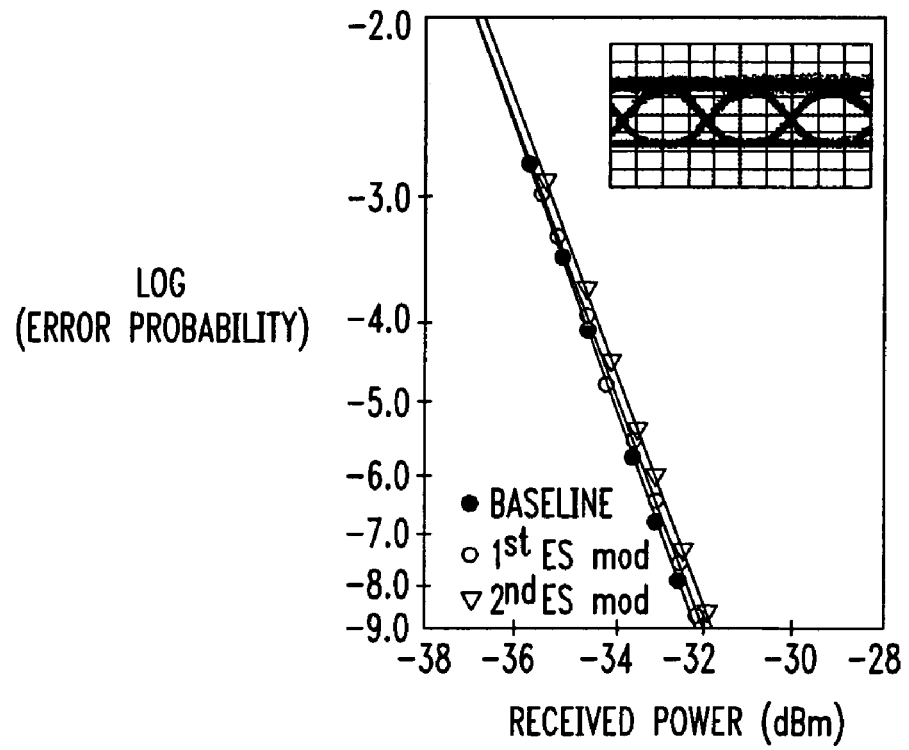
FIG. 6b shows the BER results for back-to-back, first ES modulated alone, and second ES modulated alone using the configuration depicted in FIG. 6a. The inset shows an eye diagram after transmission through the system.

FIG. 6b shows the bit-error rate (BER) performance of the associated network configuration (FIG. 6a), as measured at the Network Node. A single wavelength ($\lambda_1$=1544.7 nm) serves two End Stations, each connected to a distinct AN. The open circles correspond to modulation of the network-provided optical chalkboard at the first End Station (in effect, a 622-Mb/s link from the first ES to the NN, with the second ES unmodulated and therefore serving as a transmission amplifier). The solid triangles show performance for modulation at the second ES (in this case, a 622-Mb/s link from the second ES to the NN, with the first ES serving as a transmission amplifier for the optical chalkboard as it traverses AN 1). In both cases, the performance is nearly identical, with less than 0.1-dB difference in sensitivity at $10^{-9}$ BER. The power penalty relative to the SOA/Modulator and PIN-FET "back-to-back" (solid circles) is less than 0.3 dB.

Figure 7A:
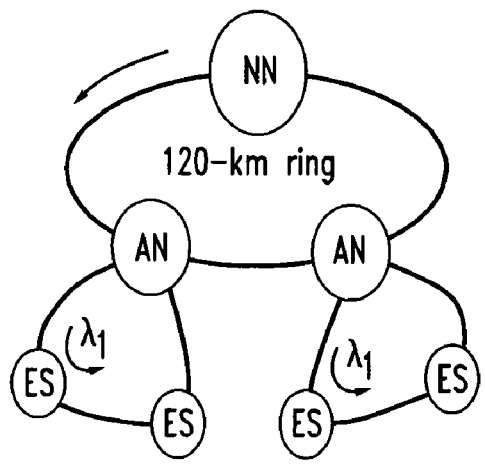
FIG. 7a shows Two ANs, each with two ESs using a single wavelength virtual ring, with ESs both on the same AN, and on a remote AN.
Figure 7B:
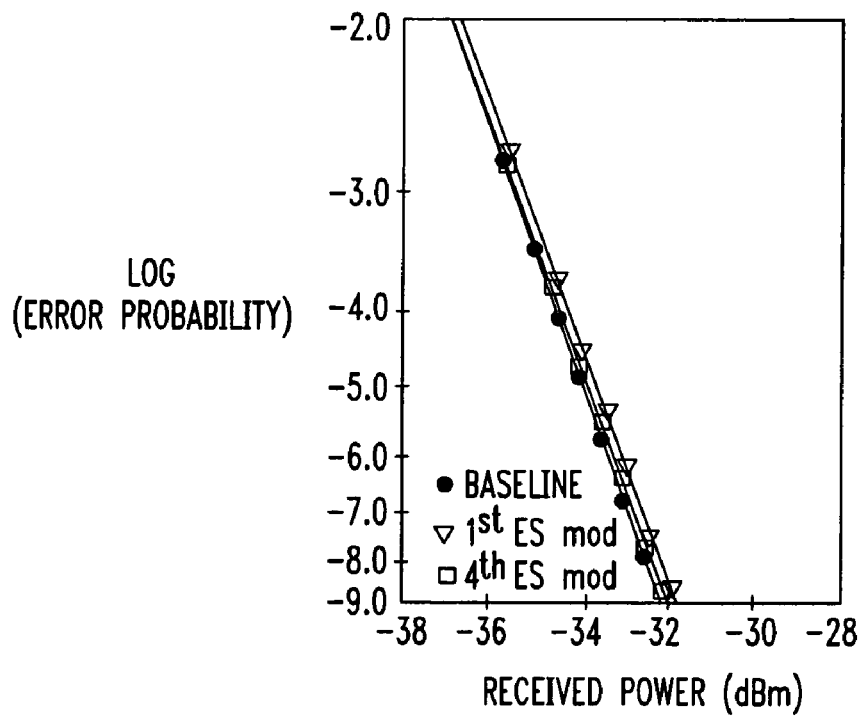
FIG. 7b shows the BER results using the configuration depicted in FIG. 7a, which essentially demonstrates that there is no penalty for modulation at any location.

FIG. 7b shows BER performance for the same 120-km ring network, for which one additional ES has been added to each AN (FIG. 7a). Since BER performance does not vary greatly from ES to ES, only the extreme cases of 622-Mb/s modulation at the first ES (triangles) and 622-Mb/s modulation at the last ES (squares) are plotted. Again, the total power penalty relative to "back-to-back" is less than 0.3 dB.

Figure 8A:
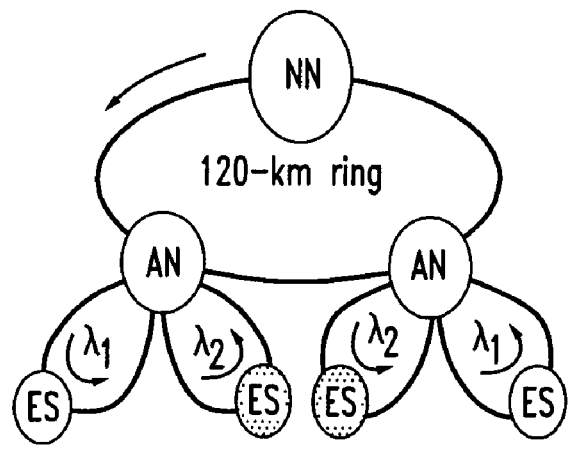
FIG. 8 shows two virtual rings on two wavelengths, one ES per AN per virtual ring.
Figure 8B:
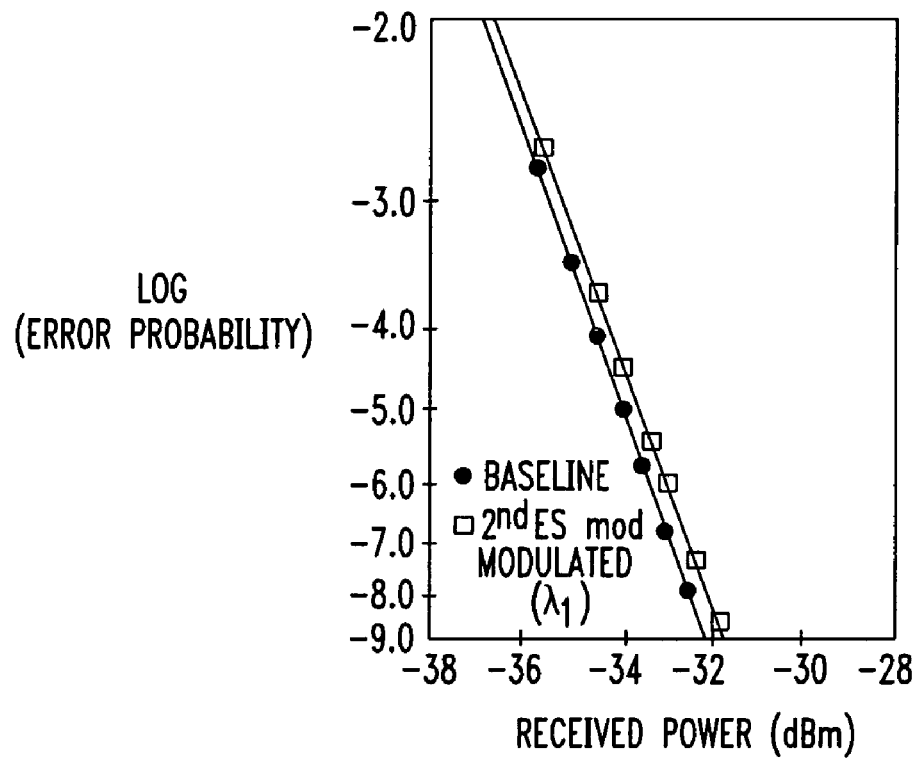

FIG. 8 represents a scenario in which the demand for bandwidth is increased, resulting in the provisioning of two virtual rings (FIG. 4) on $\lambda_1$=1544.7 nm and $\lambda_2$=1549.1 nm to serve the same set of ESs shown in FIG. 7. In this case, each AN is connected (in a local sense) to its associated ESs in a two-wavelength distribution star configuration (rather than the distribution loops associated with each AN in FIG. 7a). Note that each virtual ring in FIG. 8 is equivalent to the virtual ring in FIG. 6a. Thus, in the absence of crosstalk between wavelengths, it can be expected the BER performance plotted in FIG. 9 to be identical to that in FIG. 6b. The squares represent 622-Mb/s data added at the second ES on $\lambda_1$ and are also indicative of BER performance with the first ES modulated. In this case, $\lambda_2$ was modulated at 622 Mb/s at the NN and did not cause a measurable crosstalk penalty.

Figure 9:
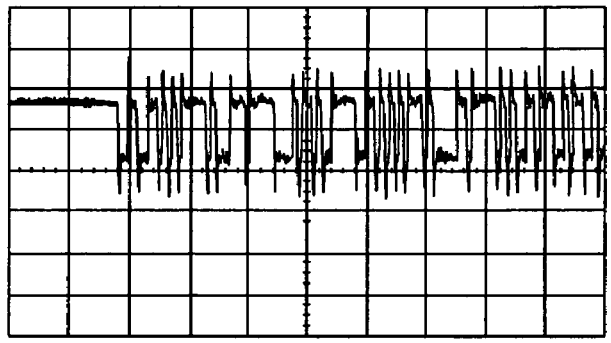
FIG. 9 shows the BER results for the configuration depicted in FIG. 8, confirming essentially identical results to FIG. 6b and FIG. 7b.

The BER data plotted in FIGS. 6b, 7b and 9 demonstrates upstream transmission for one or two wavelengths. However, based on the performance of commercially available WGRs, and on the gain bandwidth of the SOAs, it can be expected that a fully populated system (eight wavelengths spread over 6.4 nm for the 16-port WGRs) would also operate without significant crosstalk penalties. Test data also shows up to four SOAs in cascade without appreciable penalty. It can be expected that a properly engineered system could support at least eight ESs per virtual ring. While downstream transmission (from the NN to a user's ES) has not been implemented, downstream transmission is not as challenging, since the NN transmitters can employ conventional external modulators, which generally outperform SOA/modulators.

Figure 10:
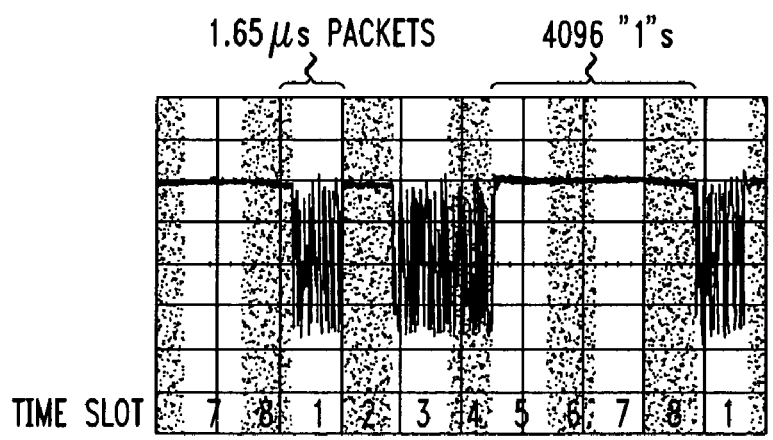
FIG. 10 shows the packet format in the ring with alternating data and optical chalkboard.
Figure 11:
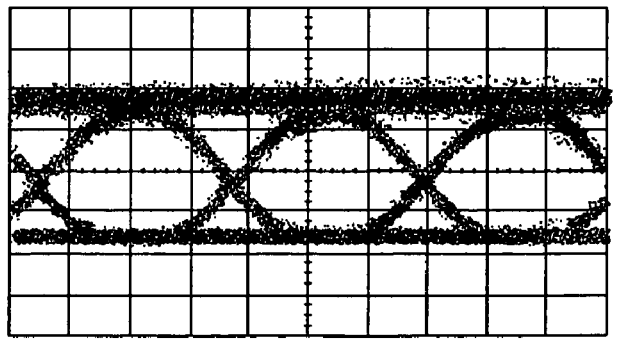
FIG. 11 is the eye diagram for packet experiment shows slight distortion due to the optical chalkboard.

The BER data reported above was measured in conventional continuous mode, i.e. using a repeating pseudo-random bit stream continuously clocked at the data rate. Although this is sufficient to demonstrate many key aspects of the ring architecture (such as the performance of the SOAs under high-speed modulation, SOA cascadability without significant power penalty due to Amplified Spontaneous Emission (ASE) accumulation, system power margins around the ring, and tolerance to crosstalk), continuous BER measurements are not a valid test of burst-mode performance. While the entire system was not tested under true burst-mode conditions, due to a lack of both 622-Mb/s burst-mode receivers and a burst-mode bit-error rate test set capable of operating beyond 200 Mb/s, SOAs were modulated with packet data to test their suitability as burst-mode transmitters. FIGS. 10-11 are oscilloscope traces showing the packet-modulated signal after detection on a broadband dc-coupled optical-to-electrical converter. The trace in FIG. 10 shows the entire repeating pattern consisting of eight 1024-bit slots (this length was limited by the 8192-bit maximum programmable buffer size of bit-error rate test set used). Four consecutive optical chalkboards in slots 5-8, comprising 4096 consecutive digital ones, indicate reasonable low-frequency performance of the SOA/modulator. The filtered burst-mode eye diagram (FIG. 11) is wide open, but shows evidence of a slight splitting of the upper rail which should result in less than 1 dB of power penalty. The dark solid portion of the upper rail is due to the long strings of ones from the optical chalkboards. A more thorough investigation of the network's burst-mode performance, which requires burst-mode BER testing, is currently underway.

A metro ring architecture capable of supporting multiple virtual transparent rings, each potentially shared among multiple user terminals with arbitrary geographical distribution has been described and has been demonstrated at a peak rate of 622 Mb/s. User terminals modulate network-provided and network-controlled wavelengths with inexpensive, polarization-insensitive and wavelength-insensitive SOA/Modulators, which also serve as in-line transmission amplifiers. BER measurements were performed in continuous mode to test the SOAs' response to high-speed modulation and confirmed cascaded operation in these systems. Negligible upstream power penalties were observed for three configurations of a 120-km ring: a single wavelength ring serving 2 and 4 user terminals, respectively, and a two-wavelength, two-user-per-wavelength configuration. Time-domain measurements have shown that these SOAs should perform adequately when modulated in burst-mode with packet data. True packet transmission over the network, which is necessary to realize the sharing of virtual wavelength rings among multiple user terminals, will require the implementation of a MAC protocol, such as modified versions of the existing FDDI or ADAPT protocols. A simple analysis showed that the network efficiency could be improved, for both FDDI and ADAPT, by implementing a bi-directional version of the network of the present invention.

While the unidirectional ring architecture described above is simple, it suffers reduced efficiency and throughput compared to a bi-directional ring architecture, as described above. Bi-directional rings are, however, subject to scattering impairments. A novel bi-directional node is now described.

Figure 12A:
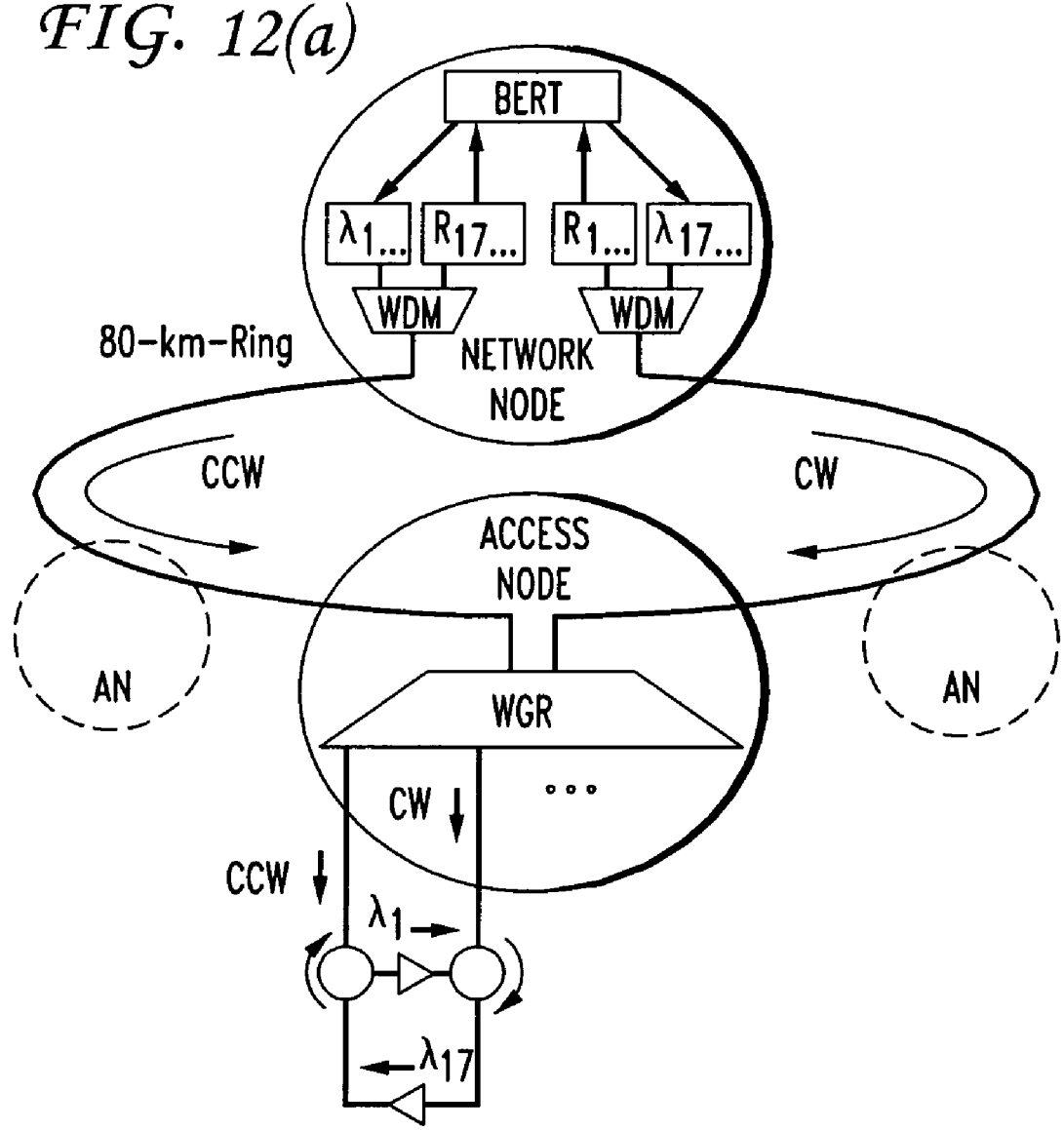
FIG. 12a depicts an exemplary embodiment of a bi-directional node of a shared transparent WDM "virtual ring" network.
Figure 12:
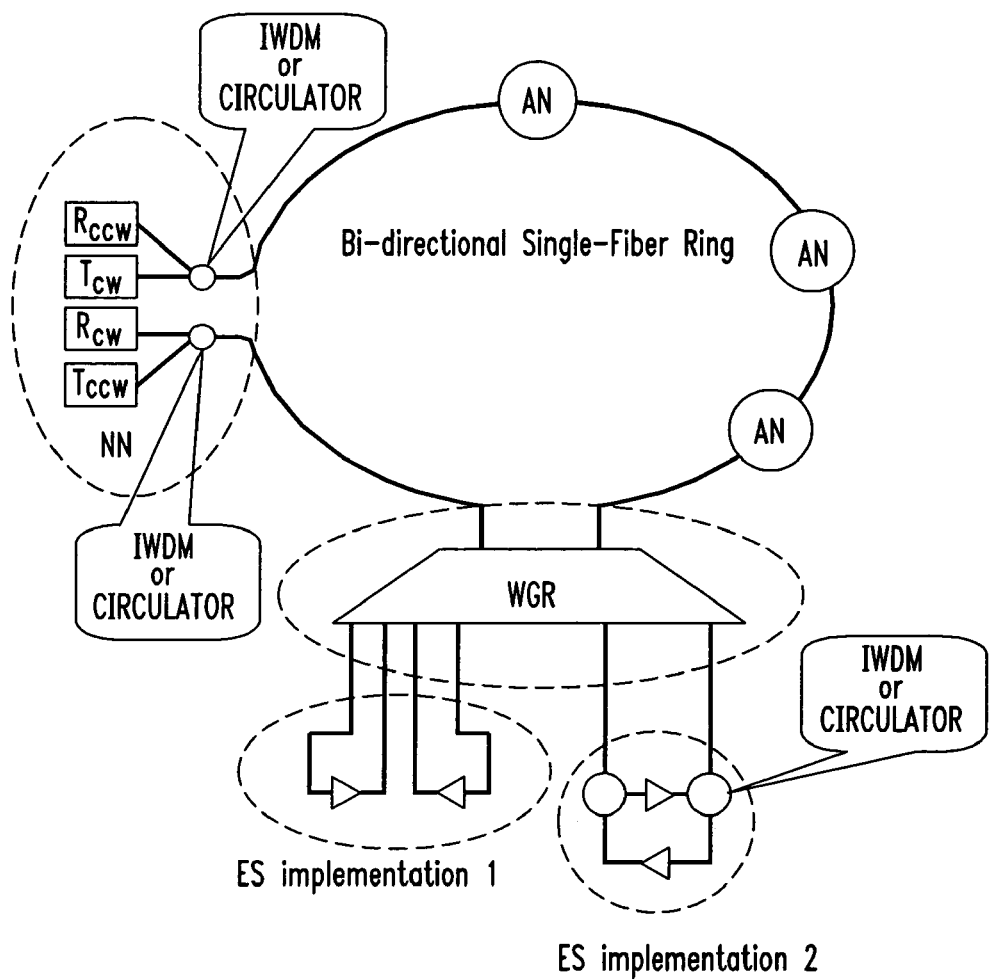

FIG. 12a depicts a bi-directional node of a shared "virtual ring" network of the present invention and an experimental layout, with dashed circles representing illustrating access nodes and user terminals that were not experimentally realized. The hub (NN) (shaded) contains WDM transceivers (or transmitters and receivers) for both directions, the (unshaded) circle is the experimentally realized access node, comprising a waveguide grating router (WGR) or arrayed waveguide grating (AWG), with a user's site (ES) below the access node. The user's site comprises two circulators and two transceivers of the type used in the unidirectional ring, implemented as SOAs. Light in the ring traveling in the clockwise-counter clockwise (CW-CCW) direction emerges from the WGR onto the CW-CCW line at the user's site, finds its corresponding transceiver through a circulator, emerging on the counter clockwise-clockwise (CCW-CW) line through the other circulator. (In this arrangement, the user accesses both propagation directions with a single pair, versus two pairs, of distribution optical fibers to his remote location at the cost of extra circulators.) To avoid serious Rayleigh scattering impairments, the counter-propagating wavelengths are assumed to be different. The wavelengths are separated by at least one free spectral range of the WGR at each port.

The architecture depicted in FIG. 12b includes a single Network Node, at which all network wavelengths are sourced. The Network Node includes two sets of WDM transmitters and receivers shown as $T_{cw}$, $R_{cw}$, $T_{ccw}$, and $R_{ccw}$, where the subscripts "cw" and "ccw" denote clockwise and counterclockwise propagating WDM channels, respectively. This bi-directional architecture requires that each user have independent access to two counter-propagating wavelengths, necessitating a redesign of the user end station. FIG. 12b includes two versions of the bi-directional ES. Implementation 1 simply consists of two of the ES's shown in FIG. 2b, with the triangle representing the discrete components comprising the ES in FIG. 2b. This implementation has the disadvantage that it requires twice the distribution fiber (it can be expected that the maximum length of a distribution fiber loop is several kilometers) and that it requires twice the number of ports on the distribution side of the WGR (since each user group now requires two virtual rings). Implementation 2 shows an ES design that avoids both of these shortcomings. By taking advantage of the periodicity (or cyclic-frequency) property of the WGR two wavelengths, separated by the WGR's free-spectral range (FSR), will traverse the same path from the ring fiber, through the WGR, over the distribution loop and back again. A coarse mux/demux pair separates the counter-propagating wavelengths at the ES and multiplexes them back onto the distribution loop. A multiplexer is said to have a cyclic-frequency property if a multiplicity of approximately periodically spaced wavelengths can be multiplexed from each input fiber to an output fiber. Similarly, a demultiplexer is said to have a cyclic-frequency property if a multiplicity of approximately periodically spaced wavelengths can be demultiplexed to each output fiber from an input fiber.

Although direct Rayleigh scattering is avoided, it is still possible for double Rayleigh scattering to impair transmission. For example, counter clockwise (CCW) light ($\lambda_1$) enters the appropriate transceiver, re-enters the ring and Rayleigh scatters from the right side, accompanies clockwise (CW) light ($\lambda_{17}$) through the CW transceiver, re-enters the ring and Rayleigh scatters from the left side, re-enters the CCW path, and interferes with itself at the CCW transceiver again. A simple analysis shows that this double amplification/scattering introduces system noise as the span loss approaches the Rayleigh reflection scaled by the number of FSRs used. Filtering into directional bands at the node, avoids this, as well as direct crosstalk from the N×N configuration. The 2×2N configuration of the present invention has explicit rejection ports for direct crosstalk ('top' of the WGR).

Finally in both unidirectional and bi-directional rings, protection schemes such as BLSR/2 are possible. While unidirectional and bi-directional rings are equally efficient in terms of lightpaths, it is much more efficient, from the MAC protocol perspective, to use a bi-directional architecture. This follows from consideration of multiple path trajectories a packet would have to take through the hub, in the unidirectional case, if the packet were destined for an "upstream" user rather than a downstream user.

In experiments employing the bi-directional node of a shared "virtual ring" network, the Network Node contains transmitters consisting of isolated, external cavity lasers, externally modulated (LiNbO$_3$) with a $2^{31}-1$ pseudorandom sequence at 2.5 Gb/s (OC-48). The launched powers were –2 and –6 dBm. The CW and CCW traveling wavelengths are chosen to be separated by exactly one Free Spectral Range (FSR) of the 16×16 (50 GHz spacing) frequency-cyclic WGR (i.e. $\lambda_1$, $\lambda_{17}$) of the present invention. A 1×2 optical splitter and an optical bandpass filter are used in lieu of the WDM.

Light entering the ring in the CCW direction traverses 40 km of conventional single-mode fiber before entering the WGR at the Access Node (AN). Wavelengths selected for dropping exit the WGR and are directed via optical circulators through an unmodulated semiconductor optical amplifier (gain approximately 17 dB) and back to the WGR. The WGR is connected to the Network Node via another 40 km of fiber, to induce Rayleigh scattering. At the Network Node the signals are split, optically filtered, variably attenuated, monitored for power, and received with a commercial clock and data regenerator for bit-error-rate (BER) testing. Light travels similarly in the CW direction. Because the two wavelengths are separated by one FSR, their routing table is identical for the WGR device and both directions use the same WGR ports, and hence, the same distribution fibers.

Although the demonstration is for one user, the 16-port WGR can support up to eight bi-directional user terminals per AN as indicated in gray in FIG. 12a, and the dotted AN's of FIG. 12a indicate how the ring can potentially support multiple AN's.

Figure 12C:
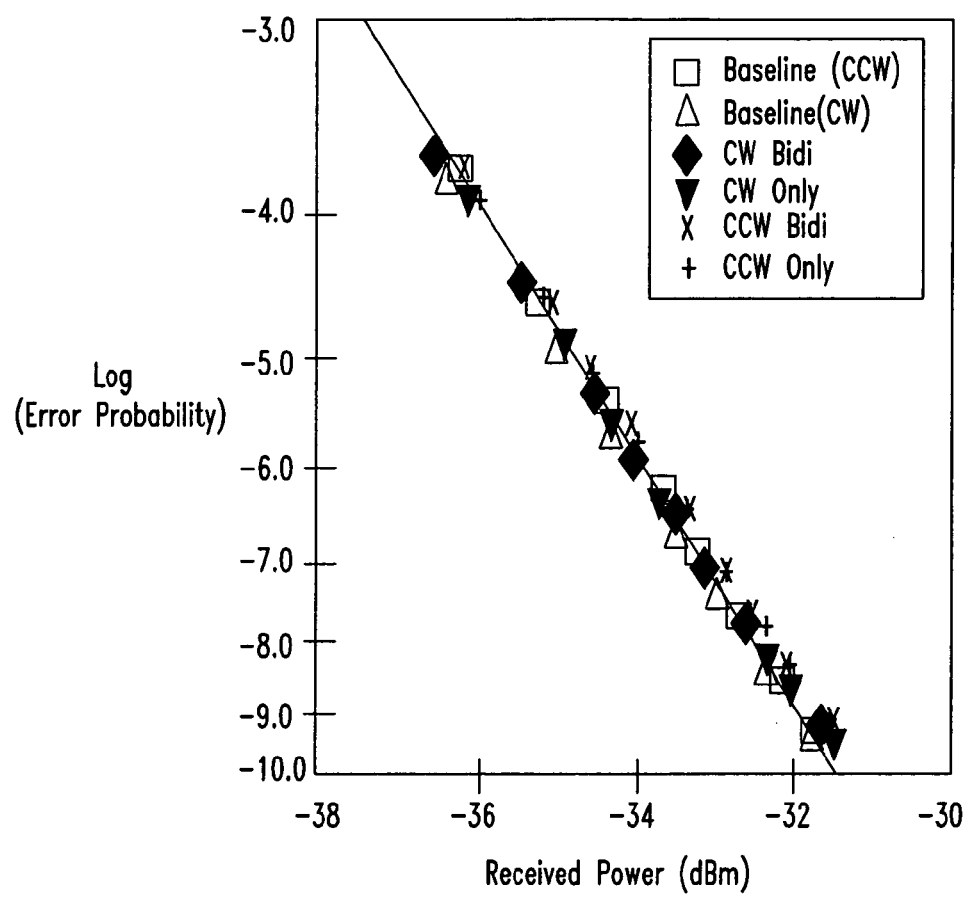

The results of the BER measurements are shown in FIG. 12c. The squares and triangles are back-to-back baseline curves for both the CCW and CW directions, respectively. The remaining four curves represent the following: the diamonds show CW signal performance under bi-directional operation; the inverted triangles show CW signal performance alone, with no CCW signal present; the X's show the CCW signal performance under bi-directional operation; the crosses monitor CCW signals without CW signals present. All six curves are virtually overlapped (~0.3 dB total spread) indicating that Rayleigh backscattering and crosstalk from adjacent FSRs over these distances result in negligible penalties for this configuration.

A bi-directional node for WDM shared "virtual ring" networks at OC-48 rates has been described and tested. Other higher or lower data rates may be employed in other embodiments of the present invention. It was found that even with 40 km of fiber on each input side to the ring, scattering impairments were insufficient to cause serious performance degradation.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

What is claimed is:

1. A method for communicating information over a WDM fiber optical ring network in a metro access area using one or more wavelengths which can be shared by a plurality of user terminals, each user terminal in said plurality of user terminals coupled to an end station, comprising the steps of: sending at least one downstream data packet; sending at least one optical chalkboard packet consisting of a recognizable pattern; sending a control signal; reading, by the end station, data packets addressed to said end station; passing packets not addressed to said end station through semiconductor optical amplifiers (SOAs); and writing data onto said optical chalkboards when permitted to do so by said control signals.

2. The method according to claim 1, wherein the reading step further comprises the steps of:
   tapping a portion of light for a receiver;
   decoding, by said receiver, downstream packets; and
   passing a remaining portion of light to a wavelength-independent and polarization independent modulator.

3. The method according to claim 1, wherein the reading step further comprises the steps of:
   tapping a portion of light for a receiver;
   decoding, by said receiver, downstream packets; and
   passing a remaining portion of light to a polarization independent modulator.

4. The method according to claim 1, wherein the reading step further comprises the steps of:
   tapping a portion of light for a receiver;
   decoding, by said receiver, downstream packets; and
   passing a remaining portion of light to a wavelength-independent modulator.

5. The method according to claim 1, wherein said writing step further comprises the steps of:
   determining when said control signals permit said writing; and
   writing data by modulating said optical chalkboard.

6. The method according to claim 1, further comprising the steps of:
   exiting said end station of light carrying data packets;
   re-entering an access node by light carrying data packets via a WDM fiber optical distribution ring; and
   continuing onto a WDM fiber optical feeder ring to a next node.

7. The method according to claim 6, wherein said next node is an access node.

8. The method according to claim 6, wherein said next node is a network node.

9. The method according to claim 6, wherein said determining step is accomplished using a Media Access Control (MAC) protocol.

10. The method according to claim 1, further comprising the steps of:
    optically amplifying downstream data packets and any upstream data created by said writing step;
    pre-equalizing any upstream data created by said writing step; and
    modulating any upstream data created by said writing step.

11. The method according to claim 9, wherein a FDDI standard protocol is modified and used as the MAC protocol.

12. The method according to claim 9, wherein an ADAPT standard protocol is modified and used as the MAC protocol.

13. The method according claim 12, wherein access nodes request bandwidth from said next node through a dedicated channel, and said next node grants bandwidth to access nodes according to a specified scheduling algorithm, and further wherein said next node is a network node.

14. The method according to claim 11, wherein said fiber optical feeder ring is unidirectional and further wherein said data packets transmitted through said next node are received by said next node and then forwarded when said next node gets a token, and further wherein said next node is a network node.

15. The method according to claim 11, wherein said fiber optical feeder ring is bi-directional, and further wherein a source transmits said data packets to a destination on one of a clockwise and counter-clockwise fiber.

16. The method according to claim 15, wherein a choice between transmitting on one of the clockwise and the counter-clockwise fiber is made such that the data packets reach said destination before reaching said next node, further wherein said next node is a network node.

* * * * *